United States Patent
Wu et al.

(10) Patent No.: US 12,014,103 B2
(45) Date of Patent: Jun. 18, 2024

(54) METHOD AND SYSTEM FOR GAME SCREEN RENDERING BASED ON MULTIPLE GRAPHICS CARDS

(71) Applicant: WELLINK TECHNOLOGIES CO., LTD., Beijing (CN)

(72) Inventors: Yuexin Wu, Beijing (CN); Jianjun Guo, Beijing (CN); Huaqing Sun, Beijing (CN)

(73) Assignee: WELLINK TECHNOLOGIES CO., LTD., Beijing (CN)

(*) Notice: Subject to any disclaimer, the term of this patent is extended or adjusted under 35 U.S.C. 154(b) by 324 days.

(21) Appl. No.: 17/598,679

(22) PCT Filed: Jan. 7, 2021

(86) PCT No.: PCT/CN2021/070651
§ 371 (c)(1),
(2) Date: Sep. 27, 2021

(87) PCT Pub. No.: WO2022/048098
PCT Pub. Date: Mar. 10, 2022

(65) Prior Publication Data
US 2022/0193547 A1 Jun. 23, 2022

(30) Foreign Application Priority Data
Sep. 2, 2020 (CN) .......................... 202010907905.2

(51) Int. Cl.
*G09G 5/36* (2006.01)
*G06F 3/14* (2006.01)

(52) U.S. Cl.
CPC .......... *G06F 3/1438* (2013.01); *G09G 5/363* (2013.01); *G09G 2360/06* (2013.01)

(58) Field of Classification Search
CPC ..... G06F 3/1438; G09G 5/363; G09G 2360/06
See application file for complete search history.

(56) References Cited

U.S. PATENT DOCUMENTS

2006/0290700 A1* 12/2006 Gonzalez ............... G09G 5/006
345/502
2010/0007668 A1 1/2010 Casparian et al.
(Continued)

FOREIGN PATENT DOCUMENTS

| CN | 101118645 A | 2/2008 |
|---|---|---|
| CN | 103927780 A | 7/2014 |

(Continued)

OTHER PUBLICATIONS

First Office Action, Application No. 202010907905.2, dated Mar. 1, 2021, 16 pages (8 pages of Official copy and 8 pages of English translation).
(Continued)

*Primary Examiner* — Antonio A Caschera
(74) *Attorney, Agent, or Firm* — AEON Law, PLLC; Adam L. K. Philipp; Charlotte E Holoubek

(57) ABSTRACT

Game screen rendering based on multiple graphics cards. Recognizing M physical graphics cards on a physical host, determining a rendering task and segmenting it into at least one rendering part; determining a target physical graphics card according to the at least one rendering part, wherein the target physical graphics card is one or more of the M physical graphics cards; rendering the at least one rendering part through the target physical graphics card; and outputting a rendering result through an output device.

7 Claims, 4 Drawing Sheets

(56) References Cited

U.S. PATENT DOCUMENTS

2013/0124772 A1* 5/2013 Zheng ................ G06F 13/4022
710/313
2020/0159310 A1 5/2020 Bakalash

FOREIGN PATENT DOCUMENTS

| CN | 107958437 A | 4/2018 |
| CN | 108960408 A | 12/2018 |
| CN | 109285108 A | 1/2019 |
| CN | 109978751 A | 7/2019 |
| CN | 112057852 A | 12/2020 |

OTHER PUBLICATIONS

Notification to Grant, Application No. 202010907905.2, dated May 26, 2021, 4 pages (2 pages of Official copy and 2 pages of English translation).
PCT International Search Report and Written Opinion, International Application No. PCT/CN2021/070651, dated Jun. 2, 2021, 15 pages (9 pages of Official copy and 6 pages of English Translation).
Second Office Action, Application No. 202010907905.2, dated Apr. 19, 2021, 17 pages (8 pages of Official copy and 9 pages of English translation).

* cited by examiner

METHOD AND SYSTEM FOR GAME SCREEN RENDERING BASED ON MULTIPLE GRAPHICS CARDS

CROSS-REFERENCE TO RELATED CASES

This application is a U.S. national phase entry of, and claims priority to, PCT International Phase Application No. PCT/CN2021/070651, filed Jan. 7, 2021, which claims priority to Chinese Patent Application No. CN 202010907905.2, filed Sep. 2, 2020. The entire contents of the above-referenced applications and of all priority documents referenced in the Application Data Sheet filed herewith are hereby incorporated by reference for all purposes.

FIELD

The present invention relates to the field of cloud games, in particular to a method and system for game scenes rendering based on multiple graphics cards.

BACKGROUND

Only the calling and rendering capabilities of a single graphics card are provided in traditional games and game engines. Multiple graphics card rendering has certain applications in the field of cloud gaming and professional graphics. The current method of using multiple graphics card rendering is Nvidia's SLI, NVLink and AMD's crossfire technology. For Nvidia's SLI and NVLink, it is needed to ensure that the multiple graphics cards used are of the same model, and the connection accessories are needed for physical connection before they can be used. Most AMD graphics cards also require a bridge for crossfire. Although a small number of devices do not require a bridge, the crossfire between the ATI card and the NVIDIA card cannot be carried out. In addition, in the existing technology, the use scenario of a single process and a single graphics card can only be met, and the graphics card cannot be switched in the middle.

SUMMARY

In order to solve the above problems, the object of the present invention is to provide a method for game screen rendering using multiple graphics cards from different manufacturers, of different models, and of different computing capabilities without the intervention of SLI and NVLink connected devices.

To achieve the above object, the present invention provides a method for game screen rendering based on multiple graphics cards, the method comprising:
recognizing M physical graphics cards on a physical host, wherein M is an integer greater than 1;
determining a rendering task and segmenting it into at least one rendering part;
determining a target physical graphics card according to the at least one rendering part, wherein the target physical graphics card is one or more of the M physical graphics cards;
rendering the at least one rendering part through the target physical graphics card; and
outputting a rendering result through an output device.

As a further improvement of the present invention, the physical host is loaded with a graphics API, and a graphics card driver of the physical host controls the M physical graphics cards,
wherein the identification of M physical graphics cards on a physical host includes:
identifying the M physical graphics cards through the graphics card driver and the graphics API.

As a further improvement of the present invention, the determination of a rendering task and segmentation into at least one rendering part includes:
when the rendering task is a game screen rendering task of a single user, the rendering task is segmented into at least one rendering part, in which each rendering part is a frame of the game screen of the user or a part of a frame of the game screen of the user; and
when the rendering task is a game screen rendering task of multiple users, the rendering task is segmented into multiple rendering parts, in which each rendering part is a frame of a game screen of one user or a part of a frame of the game screen of one user.

As a further improvement of the present invention, the rendering task is a game screen rendering task of a single user,
wherein the determination of a target physical graphics card according to the at least one rendering part includes:
when the rendering task is segmented into one rendering part, determining one physical graphics card of the M physical graphics cards as the target physical graphics card; and
when the rendering task is segmented into multiple rendering parts, determining N physical graphics cards among the physical graphics cards as the target physical graphics cards, wherein N is an integer greater than 1 and less than or equal to M.

As a further improvement of the present invention, the rendering task is a game screen rendering task of multiple users,
wherein the determination of a target physical graphics card according to the at least one rendering part includes:
determining N physical graphics cards among the M physical graphics cards as the target physical graphics cards, wherein N is an integer greater than 1 and less than or equal to M.

As a further improvement of the present invention, the rendering of the at least one rendering part through the target physical graphics card includes:
creating at least one logical device;
creating at least one renderer corresponding to the at least one logical device, wherein one logical device corresponds to one renderer; and
performing rendering processing on the at least one rendering part by using the target physical graphics card for assisting the at least one renderer.

As a further improvement of the present invention, the renderer exports the rendering result to an output device swap chain, and the output device obtains the rendering result from the output device swap chain.

As a further improvement of the present invention, the creation of at least one logical device includes:
creating a logical device from each of the target physical graphics card according to the determined target physical graphics card, wherein one physical graphics card corresponds to at least one logical device.

As a further improvement of the present invention, the output of a rendering result through an output device includes:
when the rendering task is segmented into one rendering part, the output device outputs the rendering result; and when the rendering task is segmented into multiple rendering parts, the output device merges the rendering results of the at least one rendering part for outputting.

As a further improvement of the present invention, the physical host is loaded with a graphics API,
wherein the method further includes: creating a corresponding Context for the at least one logical device, wherein one of the rendering parts is associated with one of the Context, and the graphics API is called and the identifier of the logical device is provided through the Context.

As a further improvement of the present invention, each of the rendering parts is allocated with one rendering thread for rendering.

As a further improvement of the present invention, a plurality of the rendering threads share one public rendering resource manager.

As a further improvement of the present invention, the rendering thread obtains the rendering resources required by the current rendering part from the public rendering resource manager.

As a further improvement of the present invention, the rendering thread calls the rendering resource through the rendering resource manager according to the current rendering part, and after the renderer executes the rendering process, the rendering result is outputted through the output device swap chain.

The present invention also provides a system for game screen rendering based on multiple graphics cards, the system including:
a identification unit for recognizing M physical graphics cards on a physical host, wherein M is an integer greater than 1;
a task segmentation unit for determining a rendering task and segmenting it into at least one rendering part;
a graphics card allocation unit for determining a target physical graphics card according to the at least one rendering part, wherein the target physical graphics card is one or more of the M physical graphics cards;
a rendering unit for rendering the at least one rendering part through the target physical graphics card; and
an output unit for outputting a rendering result.

As a further improvement of the present invention, the identification unit identifies the M physical graphics cards through the graphics card driver and graphics API loaded on the physical host.

As a further improvement of the present invention, the rendering unit renders the at least one rendering part through the target physical graphics card, including:
creating at least one logical device;
creating at least one renderer corresponding to the at least one logical device, wherein one logical device corresponds to one renderer; and
performing rendering processing on the at least one rendering part by using the target physical graphics card for assisting the at least one renderer.

As a further improvement of the present invention, the renderer exports the rendering result to an output device swap chain, and the output device obtains the rendering result from the output device swap chain.

As a further improvement of the present invention, the creation of at least one logical device includes:
creating a logical device from each of the target physical graphics card according to the determined target physical graphics card, wherein one physical graphics card corresponds to at least one logical device.

The present application has the advantages that: by fully utilizing the multiple physical graphics cards in the physical host to complete the rendering task in the game process of serving a plurality of users in a single process, not only game screens can be rendered by different graphics cards for all access users, but also one game screen can be rendered by the multiple graphics cards for a single user at the same time. Using one or more graphics cards for graphics rendering in a single process through the graphics API, multiple graphics card resources can be fully utilized, the rendering capacity can be improved, and a higher frame rate is achieved.

DETAILED DESCRIPTION

The technical solutions in the examples of the invention will be clearly and completely described below in conjunction with the accompanying drawings in the examples of the present invention. Obviously, the described examples are only a part of the examples, rather than all the examples, of the present invention. Based on the examples of the present invention, all other examples obtained by those of ordinary skill in the art without creative work shall fall within the protection scope of the present disclosure.

It should be noted that if there is a directional indication (such as up, down, left, right, front, rear . . . ) in the example of the present invention, the directional indication is only used to explain the relative positional relationship, movement, etc. between the components in a specific posture (as shown in the figures). The directional indications will also change accordingly as the specific posture changes.

In addition, in the description of the present invention, the terms used are only for illustrative purposes and are not intended to limit the scope of the present disclosure. The terms "comprise/comprising" and/or "include/including" are used to specify the existence of elements, steps, operations, and/or components, but do not exclude the presence or addition of one or more of other elements, steps, operations, and/or components. The terms "first", "second", etc. may be used to describe various elements, but they neither represent the order nor limit these elements. In addition, in the description of the present invention, unless otherwise specified, the term "plurality" means two or more. These terms are only used to distinguish one element from another. These and/or other aspects will become obvious in conjunction with the following figures, and it is easier for those of ordinary skill in the art to understand the description of the examples of the present invention. The figures are used to depict examples of the present disclosure for illustrative purposes only. Those skilled in the art will easily recognize from the following description that alternative examples of the structure and method shown in the present invention can be adopted without departing from the principles of the present disclosure.

Figure 1:
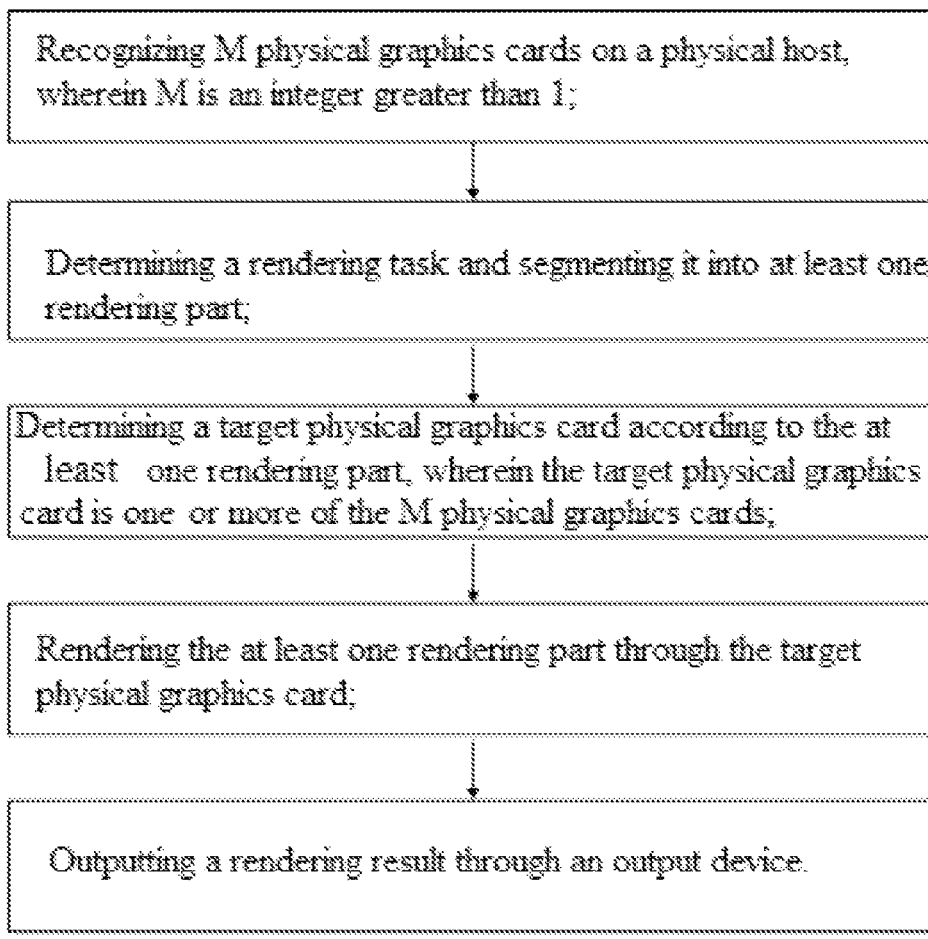
FIG. 1 is a schematic flowchart of a method for game screen rendering based on multiple graphics cards according to an example of the present invention.
Figure 2:
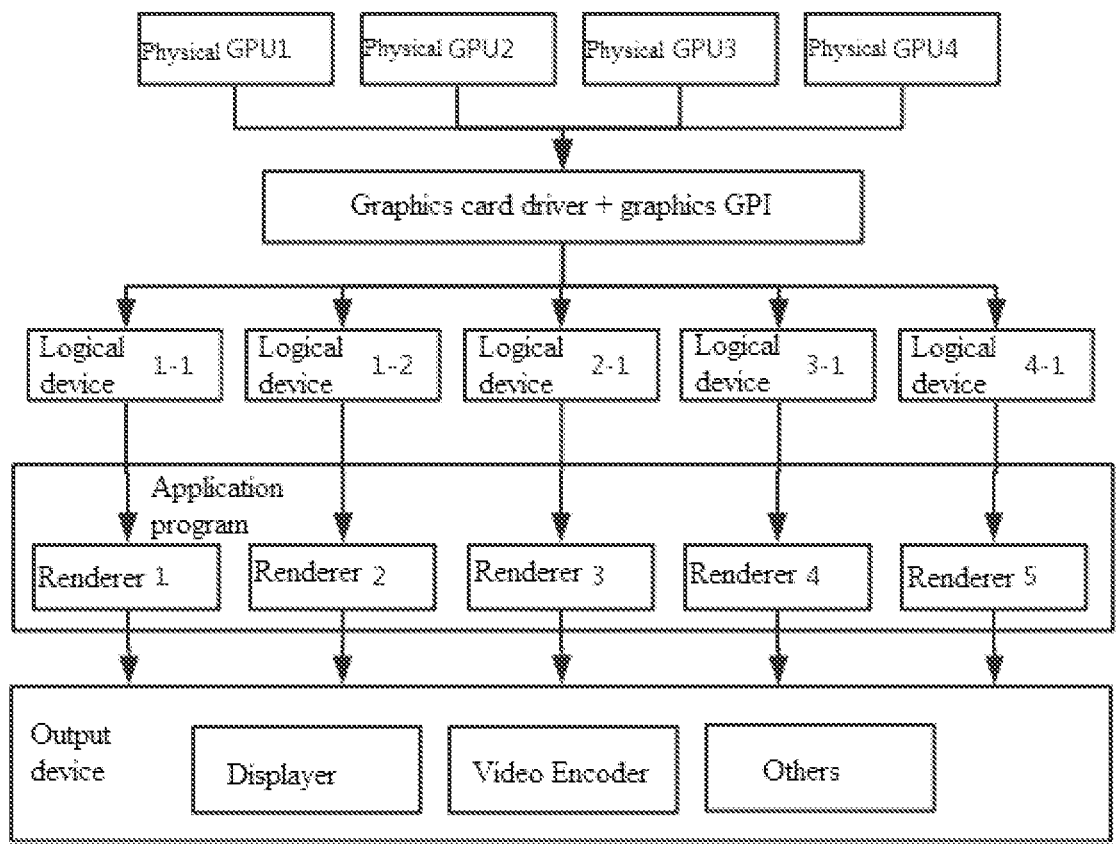
FIG. 2 is a schematic diagram of a multi-graphics card structure of a method for game screen rendering based on multiple graphics cards according to an example of the present invention.
Figure 3:
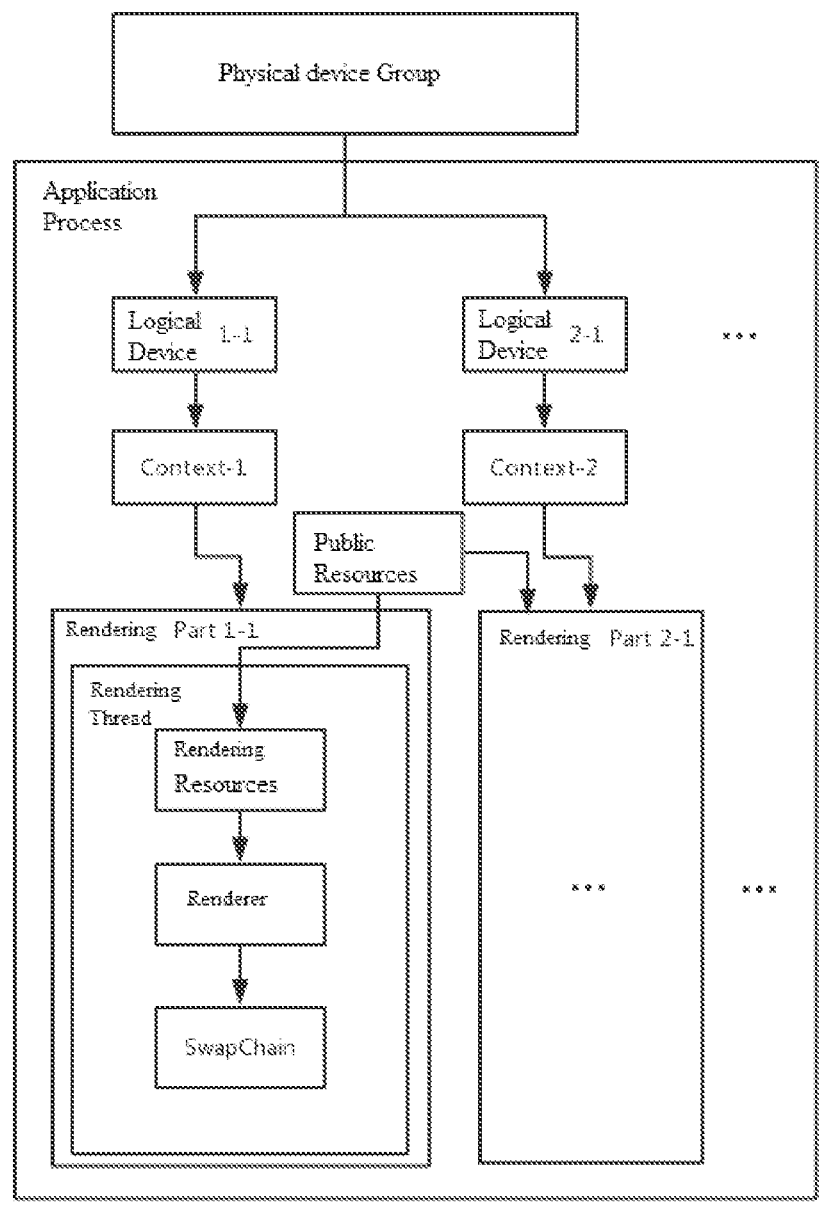
FIG. 3 is a schematic diagram of a rendering process of a method for game screen rendering based on multiple graphics cards according to an example of the present invention.

According to an example of the present invention, as shown in FIGS. 1-3, a method for game screen rendering based on multiple graphics cards includes:
  recognizing M physical graphics cards on a physical host, wherein M is an integer greater than 1;
  determining a rendering task and segmenting it into at least one rendering part;
  determining a target physical graphics card according to the at least one rendering part, wherein the target physical graphics card is one or more of the M physical graphics cards;
  rendering the at least one rendering part through the target physical graphics card; and
  outputting a rendering result through an output device.

Further, the physical host is loaded with a graphics API, and a graphics card driver of the physical host controls the M physical graphics cards,
  wherein the identification of M physical graphics cards on a physical host includes:
    identifying the M physical graphics cards through the graphics card driver and the graphics API.

In an optional embodiment, the graphics API is, for example, Vulkan API, and the physical graphics card is selected through the Vulkan API and the logical device is created from the physical graphics card. During the game process, according to the needs, M (1≤M≤number of graphics cards) physical graphics cards are selected to create N (N≥M) logical devices, and then corresponding rendering resource managers, renderers, and output device swap chains of corresponding output targets are created based on the logical devices.

Further, the rendering of the at least one rendering part through the target physical graphics card includes:
  creating at least one logical device;
  creating at least one renderer corresponding to the at least one logical device, wherein one logical device corresponds to one renderer; and
  performing rendering processing on the at least one rendering part by using the target physical graphics card for assisting the at least one renderer.

Further, one renderer corresponds to one output device swap chain, the renderer exports the rendering result to the output device swap chain, and the output device obtains the rendering result of the corresponding renderer from the output device swap chain. The output device swap chain is the SwapChain in FIG. 3.

Further, a corresponding Context is created for the at least one logical device, wherein one of the rendering parts is associated with one of the Context, and the graphics API is called and the identifier of the logical device is provided through the Context.

Further, the game process allocates one rendering thread for each rendering part for rendering.

Further, a plurality of the rendering threads share one public rendering resource manager. Rendering resources include data such as models and textures that need to be used in the current rendering part. The rendering thread obtains the rendering resources required by the current rendering part from the public rendering resource manager. When the rendering task is one rendering part and is rendered through one renderer, the renderer outputs the rendering result to the output device through the output device swap chain for displaying; and when the rendering task is segmented into multiple rendering parts and rendered by multiple renderers, the rendering result is output to the output device by the output device swap chain, and the output device merges the rendering results of multiple renderers for displaying.

Further, the determination of a rendering task and segmentation into at least one rendering part includes:
  when the rendering task is a game screen rendering task of a single user, the rendering task is segmented into at least one rendering part, in which each rendering part is a frame of the game screen of the user or a part of a frame of the game screen of the user; and
  when the rendering task is a game screen rendering task of multiple users, the rendering task is segmented into multiple rendering parts, in which each rendering part is a frame of a game screen of one user or a part of a frame of the game screen of one user.

Wherein, in the case that the rendering part is a part of a frame of the game screen, one way of segmentation is as follows: the segmentation is carried out by segmenting a plane into equal grids. In this case, the width and height of the entire plane can be determined, and the coordinates, sizes and offsets of each small block of the grid can also be determined, thereby determining the position information of each segmentation part, and the subsequent synthesis is based on the above-mentioned position information.

Further, the output of a rendering result through an output device includes:
  when the rendering task is segmented into one rendering part, the output device outputs the rendering result; and
  when the rendering task is segmented into multiple rendering parts, the output device merges the rendering results of the at least one rendering part for outputting.

In an optional embodiment, when multiple graphics cards are needed to complete one rendering task, the rendering data flows to the swap chain of the readable buffer, and the graphics card that assists rendering outputs the data to the buffer, and then the data is combined by the graphics card responsible for emerging the picture and is output through the swap chain output to the screen. In this way, by rationally distributing rendering resources, rendering targets, and combined rendering effects, the ability of multiple graphics cards to render a scene together can be fully exploited. The specific process is as follows: the number of graphics cards involved in rendering is selected according to the complexity of the scene, and the scene screen is divided into blocks, according to the number of graphics cards allocated. The resources required for rendering is provided for each block of graphics cards, and the graphics cards responsible for rendering is allowed to perform rendering in parallel. When the rendering is completed, all the rendering results are combined and the resultant rendering result becomes a complete game screen, and finally the completed game screen is output to the display device or encoding device.

In an embodiment of rendering, the rendering task is a game screen of a single user. The rendering task is segmented into a rendering part. The rendering part is a frame of the user's game screen. One target physical graphics card is determined according to the rendering part, and one logical device is created accordingly. Each logical device corresponds to one of the renderer. The renderer renders a frame of the game screen correspondingly, and a frame of the rendered game screen is output through the output device. The above method is the same as that of a scene rendered by a single graphics card to write an independent rendering program.

In another embodiment of rendering, the rendering task is a game screen of a single user. The rendering task is segmented into multiple rendering parts, and the rendering part is a frame of the user's game screen. Multiple target physical graphics cards are determined according to the rendering part, and multiple logical devices are created accordingly. Each logical device corresponds to one of the renderers and one of the output device swap chains. The renderer renders a frame of the game screen correspondingly, and outputs the frame of the rendered game screen to the corresponding output device swap chain. The output device obtains the frame of the rendered game screen from each output device swap chain, and integrates the obtained multi-frame game screens according to the time stamp identification of the frame screens recorded during the segmentation of the rendering task and the logical device identification for performing the rendering operation, and outputs them in the form of a video stream.

In another embodiment of rendering, the rendering task is a game screen of a single user. The rendering task is segmented into multiple rendering parts, and the rendering part is a part of a frame of the user's game screen. Multiple target physical graphics cards are determined according to the rendering part, and multiple logical devices are created accordingly. Each logical device corresponds to one of the renderers and one of the output device swap chains. The renderer renders a part of a frame of the game screen correspondingly, and outputs the part of the frame of the rendered game screen to the corresponding output device swap chain. The output device obtains the part of the frame of the rendered game screen from the output device swap chain and merges the acquired multiple pieces of game screens into a complete frame of the game screen for outputting according to the stamp identification of each rendering part during the segmentation of the rendering task and the logical device identification for performing the rendering operation.

In another embodiment of rendering, the rendering task is a game screen of multiple users. The rendering task is segmented into multiple rendering parts, and the rendering part is a frame of the game screen of one user. Multiple target physical graphics cards are determined according to the rendering part, and multiple logical devices are created accordingly. Each logical device corresponds to one of the renderers and one of the output device swap chains, and multiple renderers are allocated to each user for rendering the user's game screen. One renderer renders a frame of the game screen correspondingly, and outputs the frame of the rendered game screen to the corresponding output device swap chain. The output device obtains a frame of the rendered game screen from each output device swap chain, and integrates the rendered multi-frame game screen of each user respectively according to the user identification recorded during the segmentation of the rendering task, the time stamp identification of the frame screen and the logical device identification for performing the rendering operation and outputs them in the form of a video stream.

In another embodiment of rendering, the rendering task is a game screen of multiple users. The rendering task is segmented into multiple rendering parts, and the rendering part is a part of a frame of the game screen of one user. Multiple target physical graphics cards are determined according to the rendering part, and multiple logical devices are created accordingly. Each logical device corresponds to one of the renderers and one of the output device swap chains. The renderer renders a part of a frame of the game screen correspondingly, and outputs the part of the frame of the rendered game screen of the current user to the corresponding output device swap chain. The output device obtains a part of a frame of the rendered game screen of the current user from the output device swap chain, and merges the acquired multiple pieces of game screens of the current user into a complete frame of the game screen for outputting according to the user identification recorded during the segmentation of the rendering task, the identification of each rendering part and the logical device identification for performing the rendering operation.

When a rendering program is executed for one or more users in one game process, the game process runs on a cloud server. There are multiple physical graphics cards on a physical host of the cloud server. The multiple physical graphics cards are managed by the graphics card driver, and the game process identifies the physical graphics card through a graphics card driver and a graphics API. Each physical device can be abstracted into multiple logical devices through the graphics API, and one renderer is created for each logical device. Each renderer has relatively independent graphics card resources, and corresponds to one output device for outputting and displaying rendering results.

The specific workflow is as follows:
(1) starting a game process, initializing the game process and the Vulkan API, identifying all physical graphics cards on a physical host, and recording;
(2) initializing a public resource manager;
(3) according to the received rendering task (such as adding a user), creating a rendering part, creating a logical device for the rendering part, and creating a rendering resource manager, a renderer, and an output device swap chain for the logical device allocated by the rendering part;
(4) performing rendering tasks through the renderer;
(5) when rendering is ended (e.g. the user exits), destroying the rendering part and the allocated logical device; and
(6) when the process is ended, destroying the public rendering resource manager and the Vulkan object.

The method of the present invention can be encapsulated as a graphics API library with a capability of multiple graphics card calling, and developers can use one or more graphics cards for graphics rendering in a single process by using the provided API. In a single process, multiple graphics cards can be used to work at the same time. Even in a single process, multiple graphics card resources can be fully used; in complex scenes that cannot be rendered smoothly by one graphics card, a higher frame rate can be achieved by relying on the rendering capabilities of multiple graphics cards. Moreover, the remaining computing power of the graphics card can be used. reducing the waste of resources.

Figure 4:
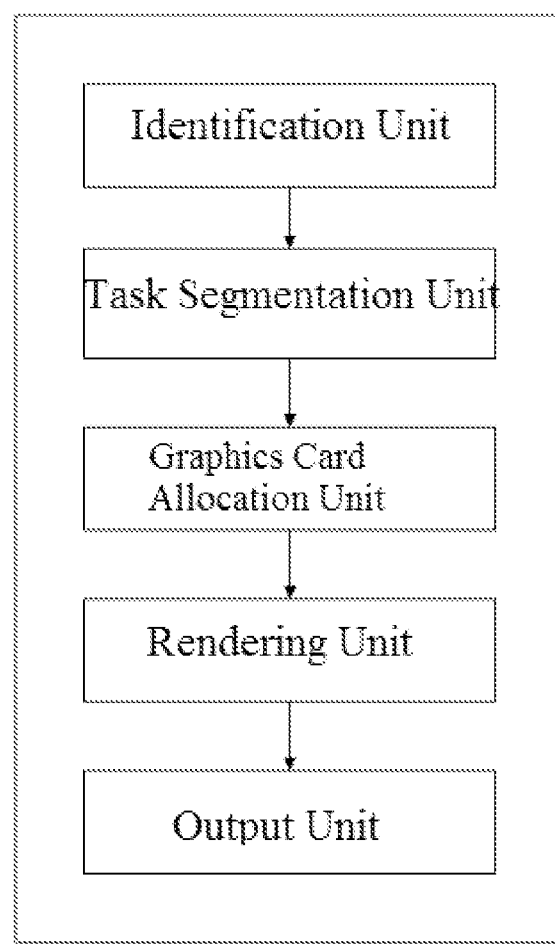
FIG. 4 is a schematic diagram of the system structure of a system for game screen rendering based on multiple graphics cards according to an example of the present invention.

As shown in FIG. 4, a system for game screen rendering based on multiple graphics cards according to an example of the present invention, the system including a recognition unit, a task segmentation unit, a graphics card allocation unit, a rendering unit, and an output unit. The identification unit is used for recognizing M physical graphics cards on a physical host, wherein M is an integer greater than 1; the task segmentation unit is used for determining a rendering task and segmenting it into at least one rendering part; the graphics card allocation unit is used for determining a target physical graphics card according to the at least one rendering part, wherein the target physical graphics card is one or more of the M physical graphics cards; the a rendering unit is used for rendering the at least one rendering part through the target physical graphics card; and the output unit is used for outputting a rendering result.

That is, those skilled in the art can understand that all or part of the steps in the method of the above-mentioned examples can be implemented by a program instructing relevant hardware. The program is stored in a storage medium and includes several instructions to enable a device (which may be a single-chip microcomputer, a chip, etc.) or a processor to execute all or part of the steps of the methods described in each example of the present application. The aforementioned storage media include: U disks, mobile hard disks, Read-Only Memory (ROM), Random Access Memory (RAM), magnetic disks or optical disks and other media that can store program codes.

In the specification provided hereby, a lot of specific details are explained. However, it can be understood that the examples of the present disclosure can be practiced without these specific details. In some instances, well-known methods, structures and technologies are not shown in detail so as not to obscure the understanding of this specification.

In addition, those of ordinary skill in the art can understand that although some examples described hereby include certain features included in other examples but not other features, the combination of features of different examples means that they are within the scope of the present invention and form different examples. For example, in the claims, any one of the claimed examples can be used in any combination.

The above descriptions are only preferred examples of the present invention and are not used to limit the present invention. For those skilled in the art, the present invention may have various modifications and changes. Any modification, equivalent replacement, improvement, etc., made within the spirit and principle of the present invention should be included in the protection scope of the present invention.

The invention claimed is:

1. A method for game screen rendering based on multiple graphics cards, the method comprising:
    recognizing M physical graphics cards on a physical host, wherein M is an integer greater than 1;
    determining a rendering task and segmenting it into at least one rendering part, wherein:
        when the rendering task is a game screen rendering task of a single user, the rendering task is segmented into at least one rendering part, in which each rendering part is a frame of the game screen of the user or a part of a frame of the game screen of the user; and
        when the rendering task is a game screen rendering task of multiple users, the rendering task is segmented into multiple rendering parts, in which each rendering part is a frame of a game screen of one user or a part of a frame of the game screen of one user;
    determining a target physical graphics card according to the at least one rendering part, wherein the target physical graphics card is one or more of the M physical graphics cards, including:
        when the rendering task is a game screen rendering task of a single user and the rendering task is segmented into one rendering part, determining one physical graphics card of the M physical graphics cards as the target physical graphics card; and
        when the rendering task is a game screen rendering task of a single user and the rendering task is segmented into multiple rendering parts, or when the rendering task is a game screen rendering task of multiple users, determining N physical graphics cards among the M physical graphics cards as the target physical graphics cards, wherein N is an integer greater than 1 and less than or equal to M;
    rendering the at least one rendering part through the target physical graphics card; and
    outputting a rendering result through an output device.

2. The method for game screen rendering based on multiple graphics cards according to claim 1, wherein the physical host is loaded with a graphics API, and a graphics card driver of the physical host controls the M physical graphics cards,
    wherein the identification of M physical graphics cards on a physical host includes:
    identifying the M physical graphics cards through the graphics card driver and the graphics API.

3. The method for game screen rendering based on multiple graphics cards according to claim 1, wherein the rendering of the at least one rendering part through the target physical graphics card includes:
    creating at least one logical device;
    creating at least one renderer corresponding to the at least one logical device, wherein one logical device corresponds to one renderer; and
    performing rendering processing on the at least one rendering part by using the target physical graphics card for assisting the at least one renderer.

4. The method for game screen rendering based on multiple graphics cards according to claim 3, wherein the creation of at least one logical device includes:
    creating a logical device from each of the target physical graphics card according to the determined target physical graphics card, wherein one physical graphics card corresponds to at least one logical device.

5. The method for game screen rendering based on multiple graphics cards according to claim 1, wherein the output of a rendering result through an output device includes:
    when the rendering task is segmented into one rendering part, the output device outputs the rendering result; and
    when the rendering task is segmented into multiple rendering parts, the output device merges the rendering results of the at least one rendering part for outputting.

6. The method for game screen rendering based on multiple graphics cards according to claim 1, wherein each of the rendering parts is allocated with one rendering thread for rendering.

7. A system for game screen rendering based on multiple graphics cards, wherein the system includes:
    an identification unit for recognizing M physical graphics cards on a physical host, wherein M is an integer greater than 1;
    a task segmentation unit for determining a rendering task and segmenting it into at least one rendering part, wherein:
        when the rendering task is a game screen rendering task of a single user, the rendering task is segmented into at least one rendering part, in which each rendering part is a frame of the game screen of the user or a part of a frame of the game screen of the user; and
        when the rendering task is a game screen rendering task of multiple users, the rendering task is segmented into multiple rendering parts, in which each rendering part is a frame of a game screen of one user or a part of a frame of the game screen of one user;
    a graphics card allocation unit for determining a target physical graphics card according to the at least one rendering part, wherein the target physical graphics card is one or more of the M physical graphics cards, including:
   when the rendering task is a game screen rendering task of a single user and the rendering task is segmented into one rendering part, determining one physical graphics card of the M physical graphics cards as the target physical graphics card; and
   when the rendering task is a game screen rendering task of a single user and the rendering task is segmented into multiple rendering parts, or when the rendering task is a game screen rendering task of multiple users, determining N physical graphics cards among the M physical graphics cards as the target physical graphics cards, wherein N is an integer greater than 1 and less than or equal to M;
a rendering unit for rendering the at least one rendering part through the target physical graphics card; and
an output unit for outputting a rendering result.

* * * * *